Jan. 5, 1971 J. S. REID 3,551,916
SEPTIC TANK VENT FOR BOATS
Filed May 13, 1969 3 Sheets-Sheet 1
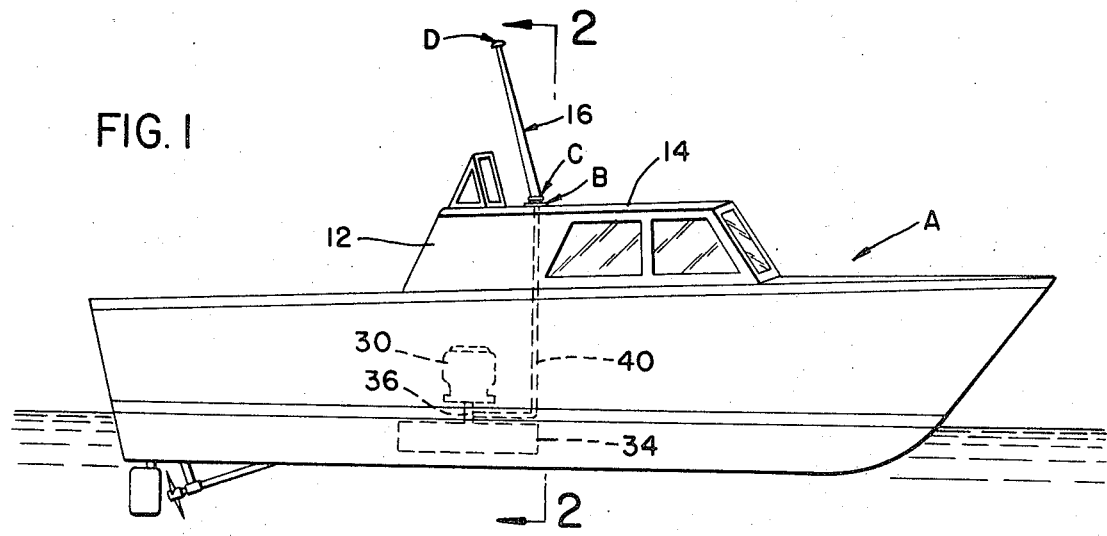
FIG. 1
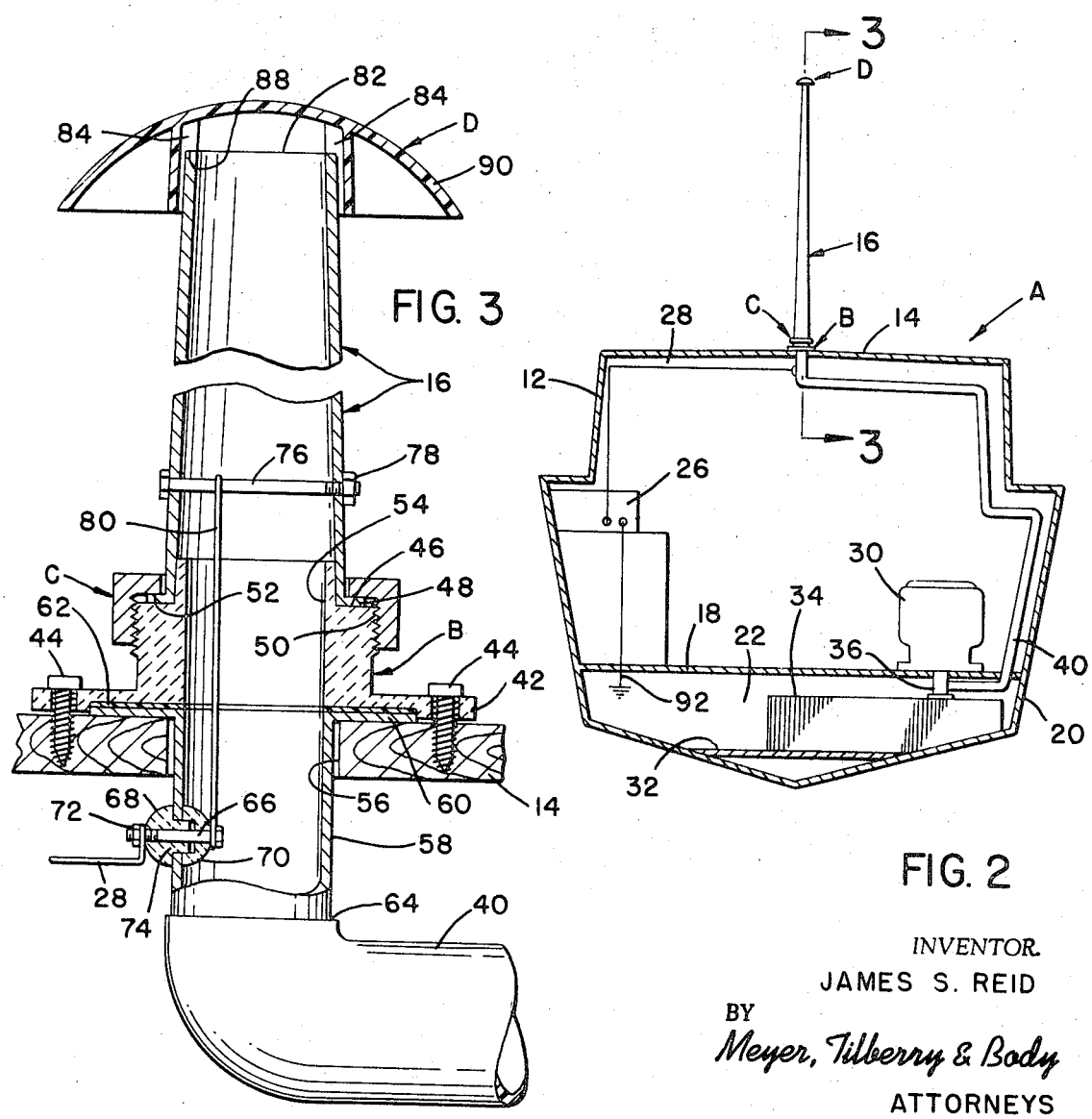
FIG. 3
FIG. 2
INVENTOR.
JAMES S. REID
BY
Meyer, Tilberry & Body
ATTORNEYS

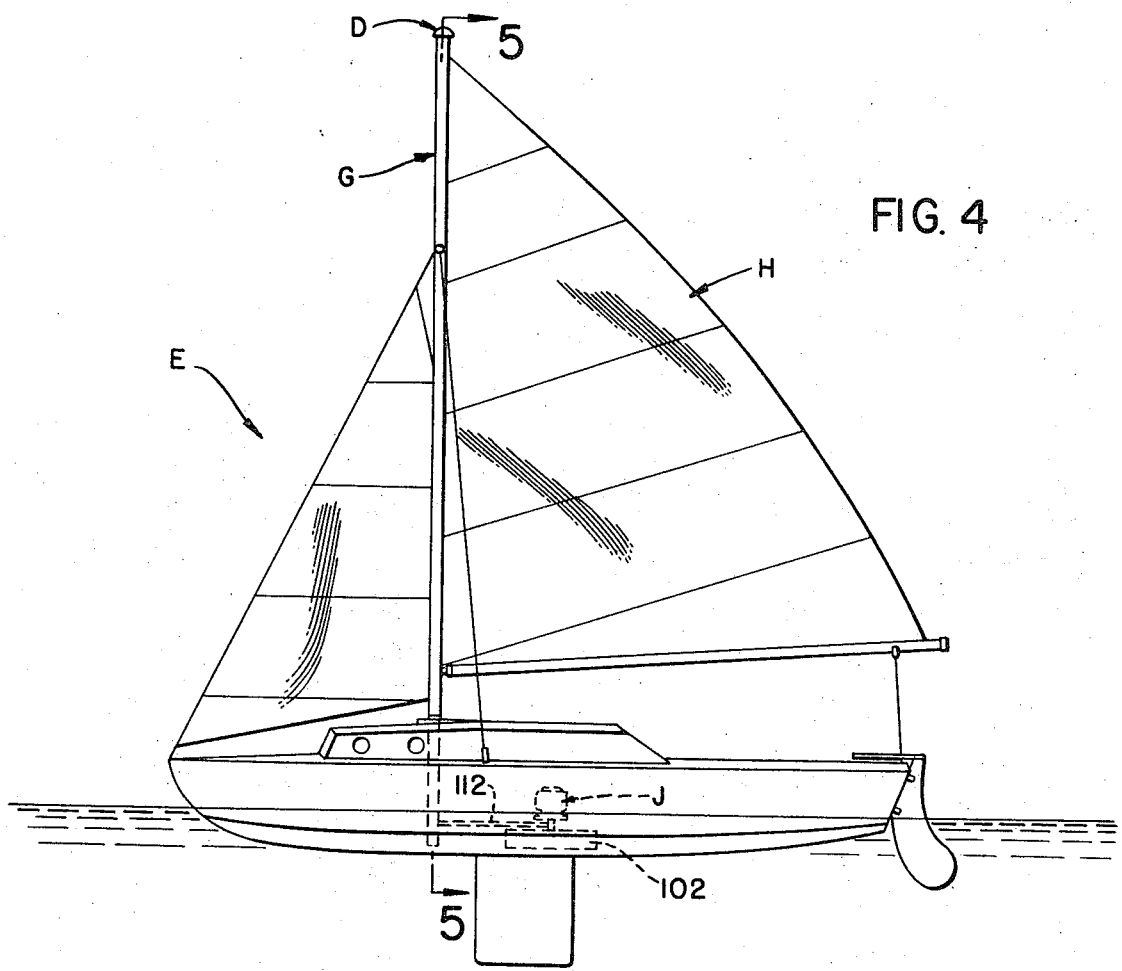
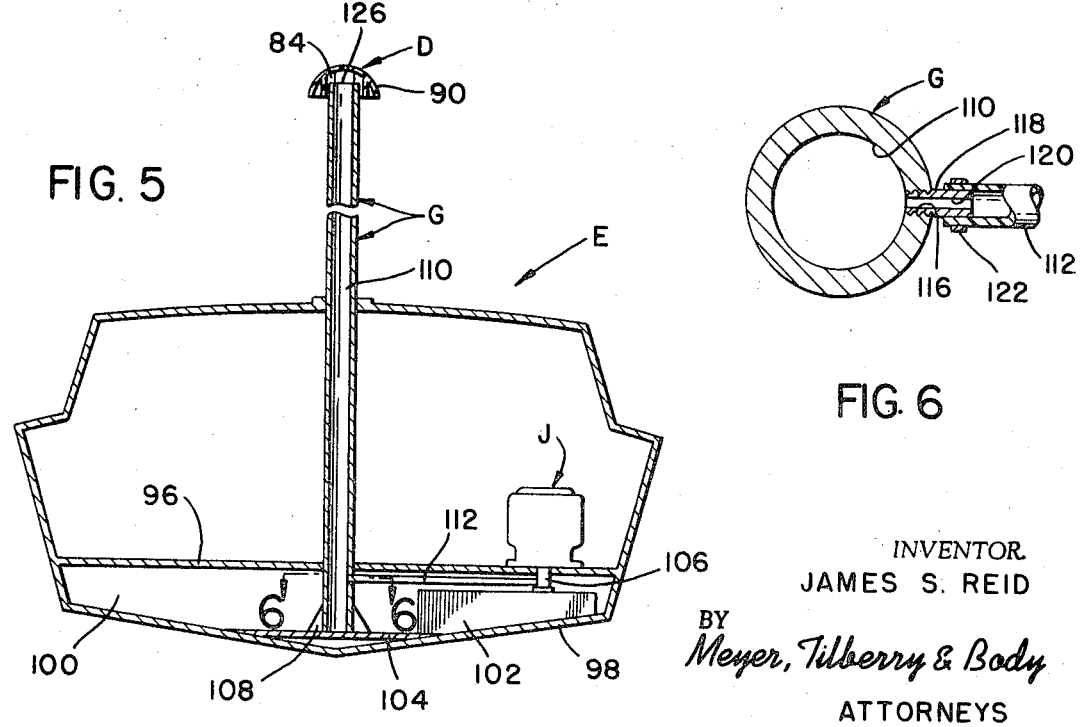
INVENTOR.
JAMES S. REID
BY
Meyer, Tilberry & Body
ATTORNEYS

Jan. 5, 1971   J. S. REID   3,551,916
SEPTIC TANK VENT FOR BOATS
Filed May 13, 1969   3 Sheets-Sheet 3
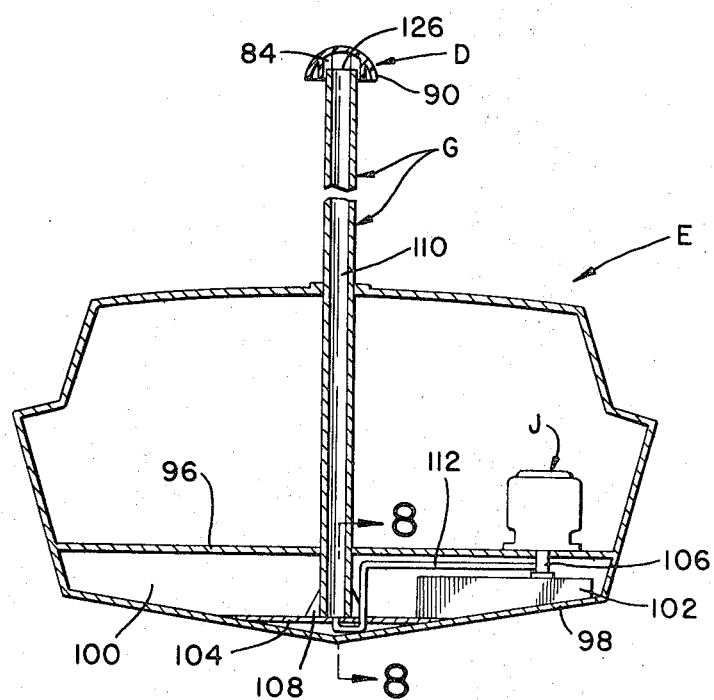
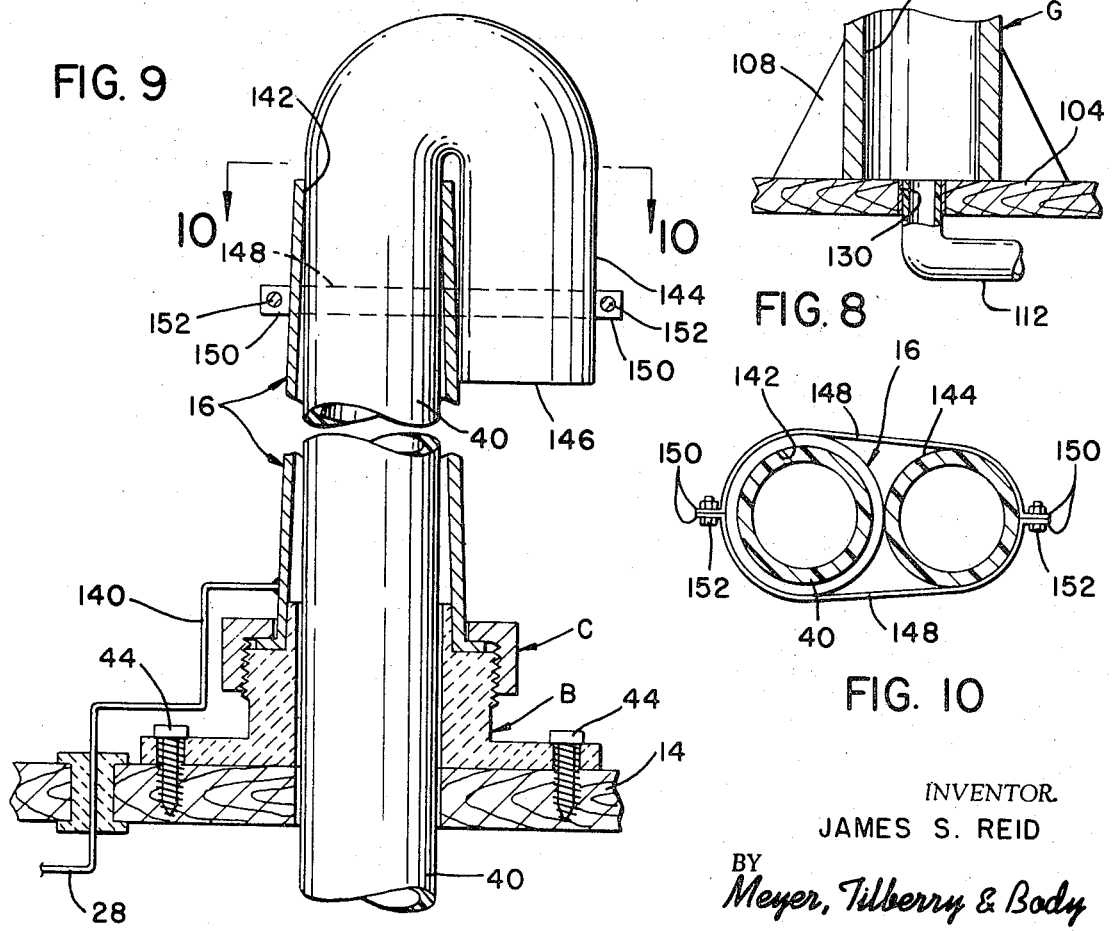
INVENTOR.
JAMES S. REID
BY
Meyer, Tilberry & Body
ATTORNEYS 3,551,916
SEPTIC TANK VENT FOR BOATS
James S. Reid, Hudson, Ohio, assignor to The Standard Products Company, Cleveland, Ohio, a corporation of Ohio
Filed May 13, 1969, Ser. No. 824,067
Int. Cl. E03d 9/04
U.S. Cl. 4—83                                12 Claims

ABSTRACT OF THE DISCLOSURE

A boat having a toilet and storage tank for wastes from the toilet is provided with a storage tank vent. The boat may be one having a transceiver and a transceiver antenna. The transceiver antenna extends very high above the boat and is hollow. A vent conduit connects the waste tank with the hollow transceiver antenna and gases formed in the waste tank are exhausted to atmosphere through opening means in the top portion of the transceiver antenna. The boat may be a sailboat having a sail supporting mast which is hollow. A vent conduit connects the waste tank with the hollow mast to exhaust gases to atmosphere through opening means in the top portion of the mast.

BACKGROUND OF THE INVENTION

This application pertains to the art of septic tank venting and more particularly to septic tank venting on boats. The invention is particularly applicable to boats equipped with transceivers and transceiver antennas, and to sailboats having vertical sail supporting masts.

Commercial boats and any pleasure boats are commonly provided with toilets for use by human occupants. Such boats commonly have a holding tank to contain wastes from the toilet while the boat is in port or close to shore. It has been common practice to discharge waste from boat toilets directly into a surrounding body of water when the boat is a sufficient distance from any occupied shore. In addition, boats docking overnight utilize a holding tank while docked so that toilet wastes are not discharged directly into the water in a harbor area. Upon leaving the harbor, this holding tank is usually emptied when the boat enters a larger body of water away from any harbor area.

Pollution of water in inland lakes and rivers is now a problem of great seriousness. In addition, pollution of ocean harbors and tidal estuaries is also a problem. When boats discharge human waste into a body of water close to a harbor or shoreline, such wastes are often carried by currents to harbors and shoreline areas. This raises the bacterial level of shoreline waters so that it is dangerous for swimming and causes unsightly and odorous algae growth along shores so that the beauty of shoreline areas for recreation is destroyed. While discharge of human waste into large bodies of water from only a few boats may not be harmful, the number of boats in use has been constantly increasing at a very rapid rate. Therefore, when thousands of boats discharge such human waste into a body of water, the entire body of water becomes polluted. Therefore, it does no good to wait until a boat is miles from any shoreline before dumping toilet wastes.

It would be desirable to have septic tanks or waste storage tanks on boats for storing human wastes and to have such tanks pumped out in a dock area where the waste could be sent directly through a sewage treatment facility. It would be desirable to eliminate dumping wastes into any body of water. With such septic or storage tanks on boats, gases are generated within the tank due to aerobic or anaerobic bacterial action. Such gases must be exhausted to atmosphere and it is desirable to have such gases exhausted at a point high above the boat deck so that no odor is perceptible to occupants of the boat. It would be desirable to exhaust such gases high above the deck of a boat by using some means already existing on the boat which is capable of serving as an exhaust stack for discharging gases to atmosphere at a point high above the boat deck.

SUMMARY OF THE INVENTION

In accordance with the present invention, a boat having a transceiver, a transceiver antenna, a toilet and a storage tank for toilet wastes, is provided with a means for exhausting gases from the waste tank to atmosphere. More specifically, the transceiver antenna is hollow and the hollow interior of the transceiver antena is connected with a vent conduit from the waste tank. In a preferred arrangement, the connection between the vent conduit and the transceiver antenna is made of insulating material which exhibits insulating properties to radio frequency signals. In another arrangement, the vent conduit from the waste tank to the antenna is formed of flexible synthetic plastic material so that the vent conduit may be trained in various curves to its point of connection with the transceiver antenna. In another arrangement, the transceiver may be grounded to a vent conduit which is metallic so that the transceiver antenna is a dipole antenna. Preferably, the antenna used as the vent stack for the waste tank is a non-directional vertical antenna. The top portion of the transceiver antenna is provided with an opening through which gases from the waste tank may escape to atmosphere. Preferably, the opening in the top portion of the transceiver antenna faces downwardly to prevent rain or spray from entering the opening. In one arrangement, this is accomplished by providing a cover positioned in spaced relationship above the opening in the top portion of the transceiver antenna. The connection between the vent conduit from the waste tank and the antenna is preferably made on the interior of the boat deck and hull where it is inconspicuous and does not interfere with the design lines of the boat.

In another arrangement of the present invention, a sailboat having a mast for supporting sails is also provided with a toilet and a waste tank for receiving waste from the toilet. The sail mast is hollow and a vent conduit from the waste tank is connected to the hollow interior of the mast. The mast has an opening in its top portion so that gases formed in the waste tank travel through the vent conduit and hollow mast, and are exhausted to atmosphere through the opening in the top portion of the mast. Preferably, the opening in the top portion of the mast faces downwardly to prevent entrance of other material into the opening. In one arrangement, this is accomplished by providing a cover over the opening and positioned in spaced relationship above the opening.

Preferably, the connection from the vent conduit to the mast is made at a position interiorly of the sailboat deck and hull so that the connection is inconspicuous and does not interfere with operation of the mast as a sail support.

It is a principal object of the present invention to prevent gases formed in a septic tank or similar waste tank on a boat, by utilizing existing equipment commonly found on boats to discharge the gas to atmosphere high above the boat deck where the odor will not be detected by persons occupying the boat.

It is a further object of the present invention to vent exhaust gases from a septic tank on a boat through a hollow radio antenna in such a manner that the connection between the waste tank and the antenna does not interfere with reception or transmission of radio frequency signals by the antenna.

It is also an object of the present invention to vent gases from a waste tank on a sailboat through the hollow sail supporting mast in such a manner that no inteference exists with operation of pulleys and sail movement on the mast.

BRIEF DESCRIPTION OF THE DRAWINGS

The invention may take physical form in certain parts and arrangements of parts, preferred embodiments of which will be described in detail in this specification and illustrated in the accompanying drawings which form a part hereof.

FIG. 1 is a side, elevational view of a boat having the present invention incorporated therein;

FIG. 2 is an elevational, cross-sectional view looking in the direction of arrows 2—2 of FIG. 1;

FIG. 3 is an elevational, cross-sectional view looking in the direction of arrows 3—3 of FIG. 2;

FIG. 4 is a side, elevational view of another form of the present invention;

FIG. 5 is an elevational, cross-sectional view looking in the direction of arrows 5—5 of FIG. 4;

FIG. 6 is a cross-sectional plan view looking in the direction of arrows 6—6 of FIG. 5;

FIG. 7 is an elevational, cross-sectional view looking in the direction of arrows 5—5 of FIG. 4 and showing a modification of the present invention;

FIG. 8 is an elevational, cross-sectional view looking in the direction of arrows 8—8 of FIG. 7;

FIG. 9 is an elevational, cross-sectional view similar to FIG. 3 and showing a modification thereof; and FIG. 10 is a cross-sectional view looking in the direction of arrows 10—10 of FIG. 9.

DESCRIPTION OF THE PREFERRED EMBODIMENTS

Referring now to the drawings, wherein the showings are for purposes of illustrating preferred embodiments of the invention only and not for purposes of limiting same, FIG. 1 shows a boat A having a cabin 12 with a roof 14 and a transceiver antenna 16 mounted on the top of roof 14. In a preferred arrangement, antenna 16 is a non-directional substantially vertical antenna.

In a preferred arrangement, as shown in FIG. 2, boat A has a deck 18 and a hull 20 between which a bilge space 22 is defined. Positioned within cabin 12 of boat A is a transceiver 26 for sending and receiving radio frequency signals by means of antenna 16. Transceiver 26 is connected with antenna 16 by wire 28 in a well known manner. Also positioned within cabin 12 of boat A is a toilet or commode 30. Positioned on a bilge bottom 32 within bilge 22 is a waste storage tank 34. Waste storage tank 34 is connected with a drain from commode 30 by fluid conduit 36. Waste tank 34 may be described as a septic tank which provides aerobic and anaerobic bacterial action to decompose wastes received therein through conduit 36 from commode 30. As is well known, this bacterial action produces gases which are very noxious to humans. In addition, such gases are often highly combustible and it is desirable to exhaust them from the bilge of the boat as they would create a fire hazard in addition to being noxious. Therefore, a vent conduit 40 is connected with the top portion of tank 34 and extends upwardly through deck 18 along the sidewall of cabin 12 and along roof 14 to a point of connection with antenna 16. Obviously, vent conduit 40 may also be connected with drain line 36 if so desired.

In a preferred arrangement, transceiver antenna 16 is hollow and is connected with roof 14 of cabin 12 on boat A by support means having a passageway therethrough. With vent conduit 40 connected with drain line 36, vent conduit 40 also prevents water from being sucked from elbow traps in toilet 30 or a lavatory when water draining through drain line 36 creates suction.

In one connection arrangement, a ceramic or glass supporting member B has a peripheral flange 42 in which holes are formed to receive lag bolts as at 44 which are threaded into roof 14. Support member B has a circular peripheral horizontal shoulder 46 against which an out turned flange 48 on the bottom of antenna 16 is positioned. A clamping nut C is threaded onto support member B as at 50 and inwardly directed upper flange 52 on nut C clamps flange 48 of antenna 18 against shoulder 46 of support member B. It is very important that support member B be formed of material which exhibits insulating properties to radio frequency signals so that the connection between vent conduit 40 and antenna 16 will not interfere with transmission or reception of radio frequency signals. Support member B has a passageway 54 extending completely therethrough and is in alignment with a hole 56 formed in roof 14. A coupling member 58 extends through hole 56 in roof 14 and has an outwardly directed flange 60 seated against the top surface of roof 14 beneath support member B. Coupling member 58 may be formed of metal, synthetic plastic material or other materials. Elastomeric gasket means 62 may be positioned between the bottom surface of support member B and the upper surface of flange 60 on coupling 58. Vent conduit 40 is then suitably connected to the bottom end of coupling member 58 as at 64. In a preferred arrangement, vent conduit 40 is formed of flexible synthetic plastic material such as polyethylene. With such an arrangement, vent conduit 40 can easily be bent and trained through the walls of cabin 12 from waste tank 34 to connection with coupling member 58. Wire 28 from transceiver 26 connects with a metal bolt 66 which is insulated from coupling member 58 by ceramic or glass insulator formed in two pieces 68 and 70. A nut 72 on bolt 66 clamps pieces 68 and 70 adjacent a hole 74 in coupling 58. A bolt 76 extends through suitable holes in a lower portion of antenna 16 has a nut 78 on its other end. A wire 80 extends from bolt 66 to bolt 76 and establishes communication between antenna 16 and wire 28 leading to transceiver 26. Antenna 16 is hollow and has an open upper end as at 82. A cover member D may be molded of synthetic plastic material and has a plurality of circumferentially spaced legs 84 extending downwardly therefrom. Legs 84 frictionally grip the upper end of antenna 16 to hold cover member D in position. Legs 84 may have shoulders 88 which butt against the top edge of opening 82. Cover member D has a lateral peripheral extension 90 which curves downwardly and preferably extends below opening 82 in antenna 16. Gases flowing from waste tank 34 through vent conduit 40 pass through opening 82 in the top portion of antenna 16 and pass between the spaces between legs 84 where they are then exhausted to atmosphere. It will be noted that cover member D, in effect, makes the exhaust opening in antenna 16 face downwardly so that rain or other foreign material cannot enter opening 82 from outside.

In one arrangement, transceiver 26 has a ground 92 in FIG. 2 and this line may be connected to coupling member 58 of FIG. 3. With coupling member 58 made of metal antenna 16 then becomes a dipole antenna when ground 92 is connected to metal coupling 58.

In the arrangement of FIG. 4, a sailboat E is provided with a mast G for supporting sails H. Sailboat E includes a deck 96 on which a toilet J is supported. Sailboat E further includes a hull 98 and a bilge space 100 is defined between hull 98 and deck 96. A waste tank 102 supported on bilge bottom 104 is connected with toilet J by drain line 106. Mast G is also blocked in position by supports as at 108 in a well known manner. Mast G is tubular and may be made of stainless steel. Mast G has a hollow interior 110 and a vent conduit 112 connects drain line 106 with the hollow interior 110 of mast G.

In one arrangement, mast G has a hole 116 formed therein and may be tapped to threadedly receive a coupling member 118 having a passageway 120 therethrough. Vent conduit 112 is then connected to coupling member 118 as at 122. When vent conduit 112 is formed of flexible synthetic plastic material such as polyethylene joint 122 may simply be a friction joint in which the end of vent conduit 112 slides over coupling member 118 and resiliently grips it. If desired, suitable adhesive may be applied to the interior of the end portion of conduit 112 to secure it to coupling 118. With this arrangement, communication is established from waste tank 102 to hollow interior 110 of mast G through vent conduit 112 and coupling 118. The top portion of mast G has an opening 126 therein through which gases from waste tank 102 are exhausted to atmosphere. In a preferred arrangement, the top portion of mast G receives a cover member D of the same type as described with reference to FIG. 3. Resilient legs 84 on coupling member D frictionally grip the outer surface of mast G to retain cover member D in position. Gases flowing through opening 126 in the top portion of mast G travel through spaces between spaced apart legs 84 and are exhausted to atmosphere. Lateral peripheral extension 90 on cover member D effectively makes the exhaust opening face downwardly so that foreign material may not enter the hollow interior 110 of mast G from outside. The connection between vent conduit 112 of mast G is preferably made within bilge space 100 below deck 96 so that there is no interference with operation of ropes and pulleys on mast G in raising and lowering sails H.

In a preferred arrangement, vent conduit 112 extends through bilge bottom 104 as shown in FIG. 7 and connects with the open bottom end of mast G. With this arrangement, it is not necessary to form a hole in mast G which may decrease its structural strength. In one arrangement, as shown in FIG. 8, a hole 130 is formed in bilge bottom 104 in communication with hollow interior 110 of mast G. With vent conduit 112 formed of flexible synthetic plastic material such as polyethylene, its end is simply positioned in hole 130 and may be frictionally retained therein when hole 130 is of slightly smaller diameter then the exterior diameter of conduit 112. If desired, adhesive may be applied to the exterior of the end portion of vent conduit 112 and to the periphery of hole 130 so that the end of conduit 112 is adhesively secured in position in hole 130. With this arrangement, the structural integrity of mast G is not weakened and gases formed by waste in tank 102 escape to atmosphere at a position high above deck 96 of sailboat E where they will not be detected by persons occupying boat E.

In another arrangement, as shown in FIG. 9, vent conduit 40 may be of flexible synthetic plastic material and extend up through hollow transceiver antenna 16 so that gases do not contact the interior of metal antenna 16. In situations where antenna 16 is formed of materials more corrosive than stainless steel, the arrangement of FIG. 9 effectively prevents contact of gases with the interior walls of antenna 16. With this arrangement, wire 28 from transceiver 26 may be connected exteriorly to antenna 16 as by a wire 140 so that there is no problem in extending vent conduit 40 all the way through antenna 16. In this arrangement, the exterior diameter of vent conduit 40 may be substantially the same size as top opening 142 in antenna 16 so that conduit 40 closes opening 142 as it extends therethrough. Conduit 40 may have its end portion 144 heat softened and bent into an inverted U-shape so that opening 146 in conduit 40 faces downwardly.

If desired, bent portion 144 of vent conduit 40 may be clamped in position as shown in FIG. 10, by two C-shaped clamping members 148 of insulating material. C-shape clamping members 148 have flanges 150 through which bolts 152 extend to clamp bent portion 144 to antenna 16. It will be understood that the same arrangement described with reference to FIGS. 9 and 10 may be applied to the arrangement of FIGS. 5–8 so that vent conduit 112 would extend vertically all the way through mast G.

It will be recognized that the boat of the present invention has surfaces defined by a hull, deck, and cabin and the connection between the antenna or mast and the waste tank is made interiorly of these surfaces so that no exterior connections are required which might interfere with the aesthetic continuity of the boat lines or create projections which might be bumped by occupants of the boat.

While only preferred embodiments of the present invention have been described in the foregoing specification and illustrated in the accompanying drawing; it will be obvious that modifications and alterations will occur to others upon reading and understanding this specification.

Having thus described my invention, I claim:

1. In a boat having non-directional vertical radio antenna means, toilet means and storage tank means for waste from said toilet means, said antenna means having a hollow interior vent conduit means extending from said tank means to said antenna means, connecting means connecting said antenna means to said boat and connecting said vent conduit in communication with said hollow interior of said antenna, said connecting means being formed of insulating material having insulating properties to radio frequency signals, said antenna means having a top portion, and opening means in said top portion establishing communication between said hollow interior of said antenna and the atmosphere.

2. The device of claim 1 wherein said opening means in said top portion and said antenna faces downwardly.

3. The device of claim 1 and further including cover means positioned in spaced relationship above said opening means.

4. The device of claim 1 wherein said vent conduit is formed of flexible synthetic plastic material.

5. The device of claim 1 wherein said vent conduit is formed of metal and said radio is grounded to said vent conduit whereby said antenna means is a dipole antenna.

6. The device of claim 1 wherein said connecting means has passageway means therethrough and said vent conduit communicates with said hollow interior of said antenna means through said passageway means.

7. The device of claim 1 wherein said boat has exterior surfaces defined by a deck, hull and cabin, and said vent conduit is connected to said antenna means interiorly of said exterior surfaces.

8. In a sail boat having a mast for supporting sails, said boat having toilet means and storage tank means for waste from said toilet means, said mast having a hollow interior, vent conduit means extending from said tank means to said mast, connecting means connecting said vent conduit means to said mast in communication with said hollow interior of said mast, said mast having a top portion, and opening means in said top portion establishing communication between said hollow interior of said mast and the atmosphere.

9. The device of claim 8 wherein said opening means in said top portion of said mast faces downwardly.

10. The device of claim 8 and further including cover means positioned in spaced relationship above said opening means.

11. The device of claim 8 wherein said boat has exterior surfaces defined by a deck, hull and cabin, and said vent conduit is connected to said mast interiorly of said exterior surfaces.

12. The device of claim 11 wherein said vent conduit is connected to said mast interiorly of said deck and hull.

References Cited

UNITED STATES PATENTS

| | | | |
|---|---|---|---|
| 2,337,318 | 12/1943 | Eliuk | 114—211 |
| 3,018,784 | 1/1962 | Buxman | 114—211 |
| 3,044,077 | 7/1962 | Balden | 4—10 |
| 3,079,612 | 3/1963 | Corliss | 4—10 |
| 3,183,525 | 5/1965 | O'Brien et al. | 4—1 |
| 3,318,248 | 5/1967 | Rambold | 4—10X |
| 3,364,840 | 1/1968 | Lipton | 114—211 |
| 3,474,467 | 10/1969 | Stinson | 4—10 |

LAVERNE D. GEIGER, Primary Examiner

H. K. ARTIS, Assistant Examiner

U.S. Cl. X.R.

343—710, 720, 900